(12) United States Patent
Khan et al.

(10) Patent No.: US 6,954,561 B1
(45) Date of Patent: Oct. 11, 2005

(54) METHODS FOR FORMING THERMO-OPTIC SWITCHES, ROUTERS AND ATTENUATORS

(76) Inventors: Anisul Khan, 125 Connemara Way #81, Sunnyvale, CA (US) 94087; Ajay Kumar, 510 Kenilworth Ct., Sunnyvale, CA (US) 94087

( * ) Notice: Subject to any disclaimer, the term of this patent is extended or adjusted under 35 U.S.C. 154(b) by 381 days.

(21) Appl. No.: 09/907,183

(22) Filed: Jul. 16, 2001

(51) Int. Cl.$^7$ ................................................ G02B 6/12
(52) U.S. Cl. ............................ 385/14; 438/24; 385/129
(58) Field of Search ........................... 385/8, 14, 24, 385/40, 129–132

(56) References Cited

U.S. PATENT DOCUMENTS

| | | | |
|---|---|---|---|
| 5,178,728 A | * | 1/1993 | Boysel et al. .................. 216/13 |
| 5,214,723 A | * | 5/1993 | Zamkotsian .................... 385/2 |
| 6,240,226 B1 | * | 5/2001 | Presby et al. .................. 385/42 |
| 6,351,578 B1 | * | 2/2002 | Brinkman et al. ............. 385/16 |
| 6,377,716 B1 | * | 4/2002 | Veldhuis et al. ............... 385/1 |
| 6,385,362 B1 | * | 5/2002 | Norwood ..................... 385/14 |
| 6,408,111 B1 | * | 6/2002 | Doerr et al. .................... 385/3 |
| 6,731,856 B1 | * | 5/2004 | Fujita et al. ................. 385/143 |

OTHER PUBLICATIONS

Astle, et al., "Optical Components—The Planar Revolution?" Merrill Lynch & Co. In–depth Report, May 17, 2000.
Fischer, et al., "Integrated Optical Waveguide Switches in SOI," Proceedings 1995 IEEE International SOI Conference, Oct. 1995, 141–142.

\* cited by examiner

*Primary Examiner*—John D. Lee
*Assistant Examiner*—Jennifer Doan
(74) *Attorney, Agent, or Firm*—Moser, Patterson, Sheridan LLC; Joseph Bach

(57) ABSTRACT

Thermo-optic devices including a bottom cladding layer, a patterned core material and a top cladding layer, each having a different refractive index, can be made by depositing a heater material, such as tungsten or chromium, on the outside of the bottom and/or top cladding layer. Depending on the refractive index differences between the cladding layers and the core layers, the amount of heater material can also be varied. The heater material can surround the cladding layers, can be present on the sidewalls and top only, or the sidewalls alone, to provide sufficient heat to change the refractive index of the layers and thus the path of light passing-through the device. These devices when built into the substrate can be connected to underlying devices for vertical integration, or connected to other devices and components formed on the same substrate for increased integration.

18 Claims, 4 Drawing Sheets

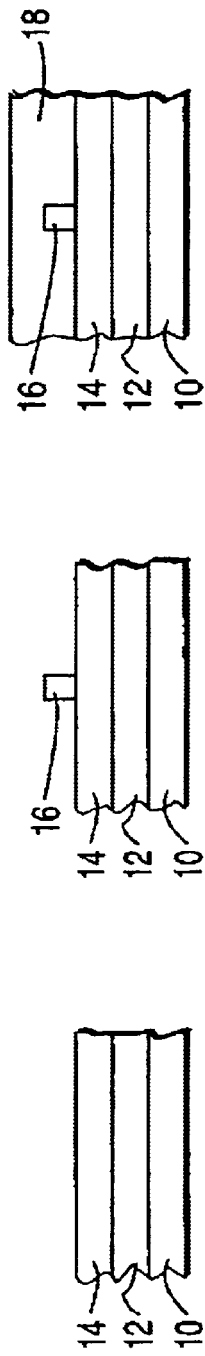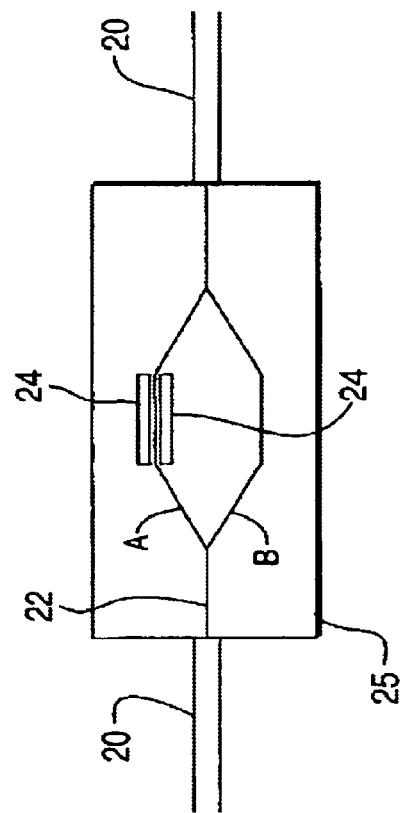

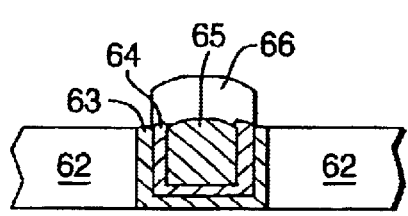
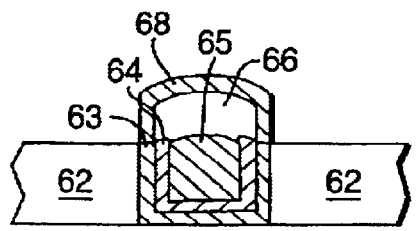
*FIG. 6D*  *FIG. 6E*
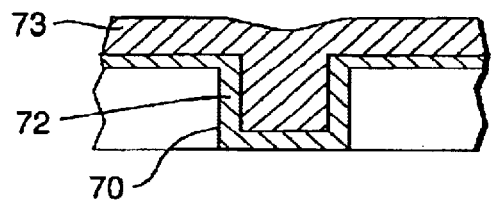
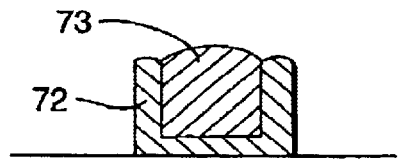
*FIG. 7A*  *FIG. 7B*
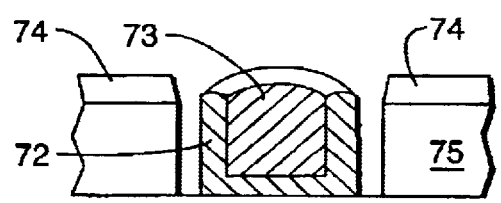
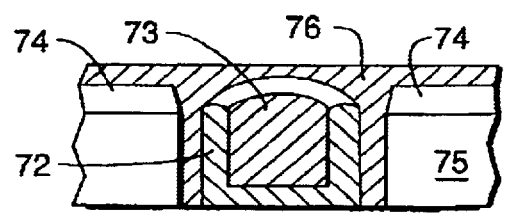
*FIG. 7C*  *FIG. 7D*
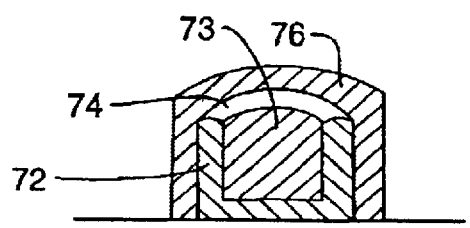
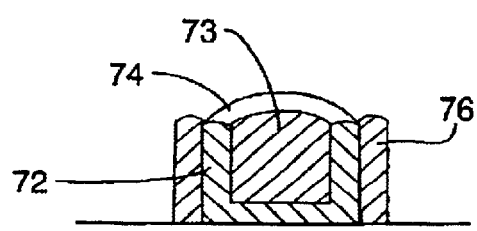
*FIG. 7E*  *FIG. 7F*

METHODS FOR FORMING THERMO-OPTIC SWITCHES, ROUTERS AND ATTENUATORS

This invention relates to novel optical devices such as thermo-optic switches, thermo-optic routers and thermo-optic attenuators and methods of making them. More particularly, this invention relates to forming integratable optical devices using in-situ thermal energy layers to change the refractive index of core and cladding layers and thus the light path through these devices.

BACKGROUND OF THE INVENTION

Planar waveguides are known that can combine discrete components on a single semiconductor substrate, such as a silicon wafer. The resulting devices can include many components on a single substrate for faster integration. Planar waveguides can be made by depositing a bottom cladding layer on a silicon substrate, depositing a core layer thereover, patterning the core layer and encapsulating the patterned core with a top cladding layer. The cladding and core layers are made of materials having different refractive indexes, such as differently doped silicon oxides for example. Light is confined in the patterned core.

FIG. 1 is directed to a conventional silicon waveguide. Referring to FIG. 1A, a silicon substrate 10 has a first or bottom cladding layer 12 thereon, having a refractive index. A core layer 14 having a different refractive index is deposited thereover, a mask layer 16 is deposited over the core layer 14 as shown in FIG. 1B. The core layer is then etched to the bottom of the cladding layer 12, which is then encapsulated with a second or top cladding layer 18, as shown in FIG. 1C. This layer can have the same or a different refractive index than the bottom cladding layer 12.

Thermo-optic switches, that can change the refractive index of the core and cladding layers by changing the temperature of the layers, are also known. These require some form of heating that can be connected to the waveguide, such as a power device or electrodes formed about an arm or layer of the device. A conventional thermo-optic attenuator is shown in FIG. 2. A light beam from an optical fiber 20 is connected to an optical waveguide 22 and divided into two light beams, A and B. One of the beams is heated by means of two electrodes 24 formed on the substrate 25, which creates a difference in the optical path length of the two beams A and B. The optical output power is based on the temperature difference between the two paths for beams A and B.

However, forming the electrodes adds several steps to the manufacture of the above device, and it would be desirable to form the heater in situ, without having to deposit and pattern the electrodes, and connect them to a source of power. The present methods can be used to make thermo-optical switches, attenuators and the like that are integrated with both passive and active devices on a single substrate.

SUMMARY OF THE INVENTION

We disclose below several methods of forming various thermo-optic devices in situ. Depending on the amount of heat required, more or less of a heater material is incorporated directly into thermo-optic switches and thermo-optic attenuators, saving several manufacturing steps. In all methods, a heating material is deposited along with the cladding and core layers and patterned as required.

The methods described use conventional semiconductor materials to provide materials having a differing refractive index for the core and cladding layers, and resistive heating materials, such as metal layers of tungsten or chromium for example. The metal layers can be connected to a source of current to heat the core and cladding layers. In turn, the change in temperature changes the light path of a light beam passing through the device so that none, all, or a portion of the light passes through the device. The thermo-optic switches can be formed in a semiconductor substrate, allowing integration of the thermo-optic devices with other components on or already formed in the substrate.

BRIEF DESCRIPTION OF THE DRAWING

FIGS. 1A–1C illustrate a prior art waveguide manufacturing method.

FIG. 2 illustrates a prior art variable optical attenuator including a pair of electrodes.

FIGS. 6A–6E illustrate still another embodiment of the present invention for making thermo-optic switches wherein the switch is formed within a silicon substrate.

FIGS. 7A–7F illustrate the various method steps of a fifth embodiment of the present invention for making thermo-optic switches formed in a silicon substrate.

DETAILED DESCRIPTION OF THE INVENTION

The present thermo-optic devices as described below can be made by known semiconductor processing steps, including chemical vapor deposition steps and isotropic and anisotropic etch steps. Although the substrate in the application is described in terms of silicon, other substrate materials can be used, including InGaAs, InGaP, InP, Ga-As, Si-Ge, glass, quartz and the like. Silicon oxide can be readily doped and can be deposited from silane or TEOS, optionally including a dopant gas such as a phosphorus or boron compound and the like. As an example, the core and cladding materials can be made of silicon oxides that are differently doped, such as glass, quartz, PSG, BPSG and the like, so that they have a different refractive index. Silicon and silicon oxide can be etched with various halogens and mixtures of halogens, and mixtures of halogens and other gases, as is known. Portions of the top cladding and heater layers can also be removed using known CMP methods. Heater material layers can be deposited under and/or over the cladding layers, and can also be etched with halogens. The amount of heater material present on the devices will vary depending on the refractive index of the materials of the core and of the cladding materials.

FIG. 3A to 3F is illustrative of the steps of a first method for making thermo-optic switches of the invention.

Figure 3C:
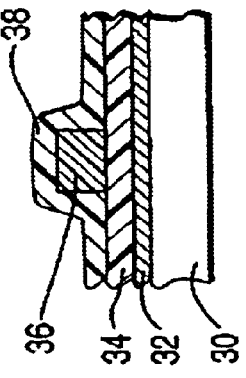
FIGS. 3A–3F illustrate the various method steps of a first embodiment of the present invention for making thermo-optic switches.
Figure 3F:
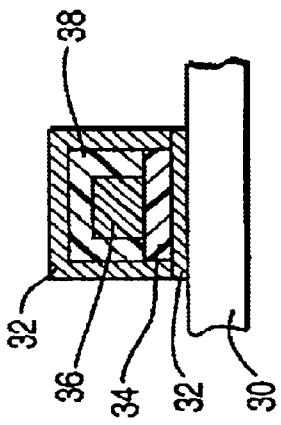
Figure 3B:
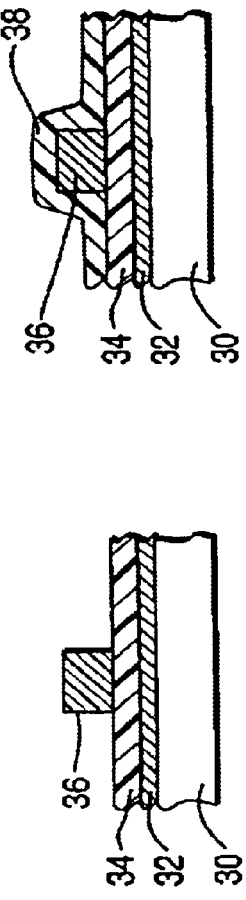
Figure 3E:
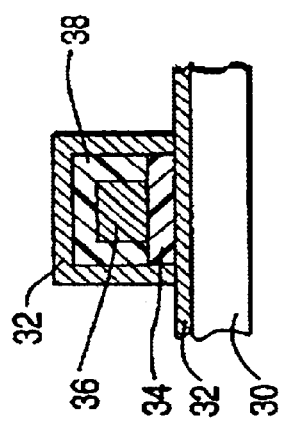
Figure 3A:
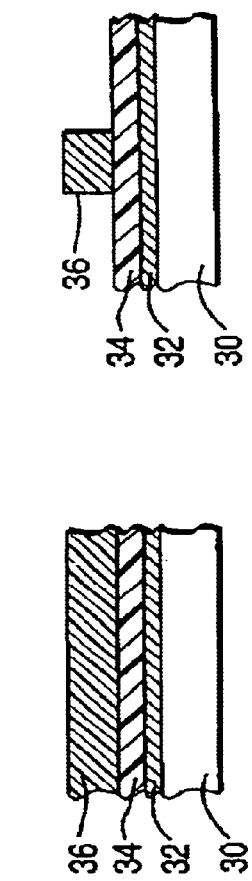

In FIG. 3A, onto a silicon substrate 30 is deposited in turn a metal heater layer 32; a bottom cladding layer 34, which can be of BPSG having a first refractive index; and a core material 36, which can be of a doped glass for example, having a second refractive index.

As shown in FIG. 3B, a patterned core layer 36 is formed using a patterned resist layer (not shown) and the core layer 36 is etched to pattern the core 36. A top cladding layer 38 is then deposited, as shown in FIG. 3C. The top cladding layer 38 can be made of PSG for example, again a material having a different index of refraction from the bottom cladding layer 34 and the core material 36.

Figure 3D:
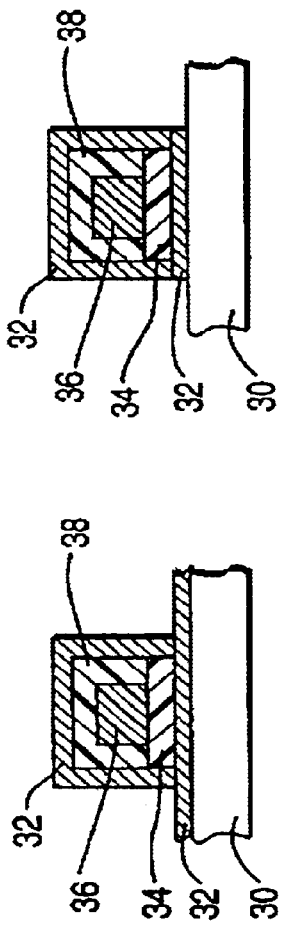

The top cladding layer 38 is patterned and etched anisotropically to leave a layer 38 of top cladding material on the top and sides of the patterned core 36, as shown in FIG. 3D.

As shown in FIG. 3E, a layer of heating material 32 is then deposited over the top cladding layer. The excess heating material 32 is etched away to form a thermo-optic device as shown in FIG. 3F. This device is surrounded by the heating material 32.

Figure 4A:
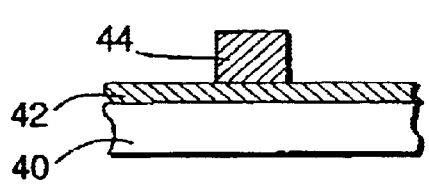
FIGS. 4A–4C illustrate the various method steps of a second embodiment of the present invention for making thermo-optic switches.

An alternate method is shown in FIG. 4. A bottom cladding layer 42 and core material 44 is deposited on the substrate 40, and the core material is patterned and etched as shown in FIG. 4A.

Figure 4B:
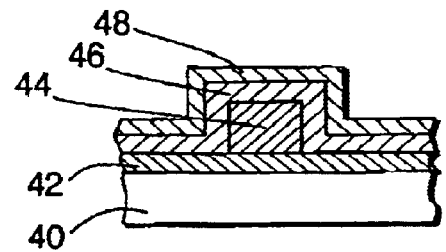
Figure 4C:
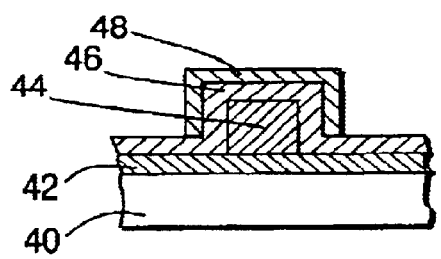

A top cladding layer 46 and heating material layer 48 is deposited over the patterned core 44 sequentially, as shown in FIG. 4B and is etched down to the top cladding layer 46, as shown in FIG. 4C. In this embodiment, the heating material is only formed over the top and sidewalls of the top cladding layer 46.

Figure 5A:
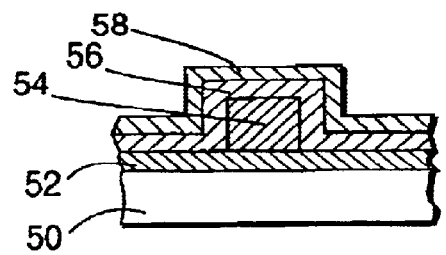
FIGS. 5A–5B illustrate the various method steps of a third embodiment of the present invention for making thermo-optic switches.
Figure 5B:
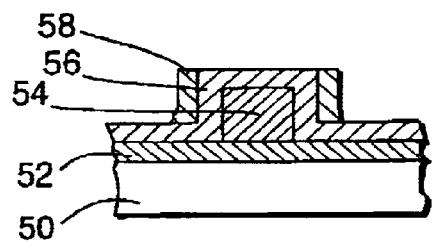

Another embodiment of the method of the invention is shown in FIG. 5. A bottom cladding material 52 and a core material layer 54 is deposited over a substrate 50. The core layer is then masked and etched. A top cladding layer 56 and a heating material layer 58 is deposited over the patterned core 54, as shown in FIG. 5A. An anisotropic etch of the heating material layer 58 is carried out so as to remove the heating material 58 from the top surface of the top cladding layer 56, as shown in FIG. 5B. In this embodiment, heater material remains only on the side of the top cladding layer 56.

This method is advantageous because it requires fewer processing steps, provided sufficient heat can be generated and passed to the thermo-optic device to change the refractive index of the core and cladding layers.

In still another embodiment of the present method, a thermo-optic device is formed within an opening formed in a silicon substrate. This method is advantageous because the thermo-optic device can be integrated with other components on the surface of the silicon substrate. As an example, a groove can be formed in the surface of the silicon adjacent to the thermo-optic device in which an optical fiber can be laid so that they are aligned readily. These thermo-optic devices of the invention can also be integrated vertically by connecting them to other devices previously formed in the substrate.

Figure 6A:
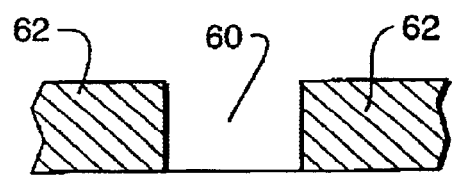
Figure 6B:
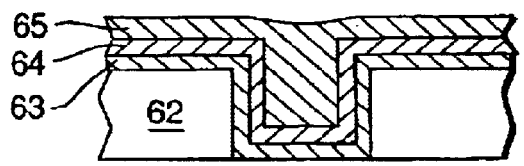
Figure 6C:
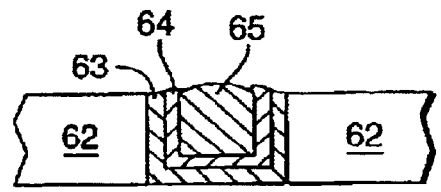

The first step of this method is to etch a straight walled opening 60 in a silicon substrate 62, in known manner, as shown in FIG. 6A. Sequential conformal depositions of the heater material 63 and a bottom cladding layer 64 are formed in the opening 60. A deposition of the core material 65 to fill the opening 60 is made, as shown in FIG. 6B. Planarization of the core material 65, as by CMP, and sequential etch steps are used to remove the excess conformal layers on the surface of the substrate. This is shown in FIG. 6C.

A top cladding layer 66 is deposited, coated with a mask layer and the excess cladding layer 66 anisotropically etched from the sides of the filled opening 60 as shown in FIG. 6D. Heating material 68 is then deposited, and the excess removed, as by etching, as shown in FIG. 6E. In this embodiment, the heater material 63, 68 surrounds the bottom and the top cladding layers 64 and 66.

In still another embodiment of the present process, an opening 70 is made in a silicon substrate 75, a bottom cladding layer 72 is conformally deposited, and a core material 73 deposited to fill the opening 70, as shown in FIG. 7A. The bottom cladding layer 72 and the core material 73 are removed from the top of the opening 70, as shown in FIG. 7B. A top cladding layer 74 is deposited, and masked and etched alongside the bottom cladding layer 72, as shown in FIG. 7C. Heating material 76 is then deposited alongside the cladding layers 72, 74, as shown in FIG. 7D. The heating material 76 is then anisotropically etched away from the top of the top cladding layer 74 adjacent to the top of the heating material and the bottom cladding layers 72, 76, as shown in FIG. 7E. In this embodiment, the heating material 76 surrounds the core 73 on three sides.

Alternatively, as shown in FIG. 7F, the heating material 76 can also be removed from the top of the top cladding layer 74, so that it remains only on the sidewalls of the bottom cladding layer 72.

By changing the refractive index of the cladding layers, the direction of incoming light can also be changed, so as to make a router.

Although the present method has been described using specific embodiments and method steps, one skilled in the art will recognize that the order of steps, the materials employed, and the final device can be varied. In addition, a high degree of integration between the present thermo-optic devices and other devices and components on the same substrate, and vertical integration with other devices previously formed in the substrate, particularly for thermo-optic devices formed within the substrate, can be achieved. This invention is meant to include such variations and is only to be limited by the scope of the appended claims.

We claim:

1. A method of making a thermo-optic device comprising:
   a) forming on a substrate an optical waveguide having a bottom cladding layer, a core layer and a top cladding layer; and
   b) depositing upon the waveguide a layer of a heating material covering portions of at least two surfaces of the waveguide, said surfaces selected from the group consisting of a first side wall, a second sidewall, a top surface and a bottom surface.

2. The method according to claim 1 wherein the substrate is formed from at least one material selected from the group consisting of silicon, gallium arsenide, doped silicon, silicon-germanium, glass, quartz, indium gallium arsenide, indium gallium phosphide, and indium phosphide.

3. The method according to claim 2 wherein the substrate is formed from silicon.

4. The method according to claim 1 wherein the bottom cladding layer and the core layer are formed in an opening in the substrate.

5. The method according to claim 1 wherein material is deposited prior to forming the bottom cladding layer.

6. The method according to claim 1 wherein material is deposited after forming the bottom cladding layer.

7. A thermo-optic device comprising an optical waveguide formed in a groove or an opening in a semiconductor substrate, the waveguide including a bottom cladding layer, a core layer and a top cladding layer, and a layer of a heating material covering portions of at least two surfaces of the waveguide, said surfaces selected from the group consisting of a first side wall, a second sidewall, a top surface and a bottom surface.

8. The thermo-optic device according to claim 7 wherein said semiconductor substrate is formed from silicon and said cladding and core layers are formed from differently doped silicon oxide.

9. The thermo-optic device according to claim 7 wherein the layer of heating material is formed from at least one metal.

10. The thermo-optic device according to claim 7 wherein the layer of heating material is formed from at least one of chromium and tungsten.

11. The thermo-optic device according to claim 7 connected to an underlying semiconductor device formed in said substrate.

12. The thermo-optic device according to claim 7 connected to a plurality of devices built onto or into said substrate.

13. A thermo-optic device comprising:

a substrate;

an optical waveguide disposed on the substrate;

a layer of heating material disposed on at least two sides of the substrate; and wherein the layer of heating material is disposed on at least one side of the waveguide.

14. The thermo-optic device of claim 13, wherein the waveguide is disposed in a featured formed in the semiconductor substrate.

15. The thermo-optic device according to claim 13 wherein the layer of heating material is formed from at least one of chromium and tungsten.

16. A thermo-optic device comprising:

a substrate;

an optical waveguide disposed on the substrate; and a layer of heating material disposed on at least two sides of the substrate;

wherein the waveguide is disposed in a featured formed in the substrate; and wherein the layer of heating material is disposed between the waveguide and the substrate.

17. The thermo-optic device of claim 16, wherein the waveguide is disposed on the semiconductor substrate; and wherein the layer of heating material is disposed on at least one side and a bottom side of the waveguide.

18. A thermo-optic device comprising:

a substrate;

an optical waveguide disposed on the substrate;

a layer of heating material disposed on at least two sides of the substrate; and wherein the layer of heating material is disposed on opposite sides of the waveguide.

* * * * *

UNITED STATES PATENT AND TRADEMARK OFFICE
CERTIFICATE OF CORRECTION

PATENT NO. : 6,954,561 B1  
APPLICATION NO. : 09/907183  
DATED : October 11, 2005  
INVENTOR(S) : Khan et al.

Page 1 of 1

It is certified that error appears in the above-identified patent and that said Letters Patent is hereby corrected as shown below:

On the Title page, Column 1, below field (76), # 73 Assignee insert --Assignee: Applied Materials, Inc. Santa Clara, CA, (US).--

On the Title page, in field (57), under "Abstract", in column 2, line 12, delete "passing-through" and insert -- passing through --, therefor.

In column 2, line 12, after "art" insert -- optical --.

In column 2, line 18, delete "invention" and insert -- process --, therefor.

In column 2, line 21, delete "invention" and insert -- process --, therefor.

In column 2, line 24, delete "invention" and insert -- process --, therefor.

In column 2, line 27, delete "invention" and insert -- method --, therefor.

In column 2, line 29, after "illustrate" delete "the various method steps of".

In column 2, line 30, delete "invention" and insert -- process --, therefor.

In column 4, line 52, in Claim 5, after "wherein" insert -- said heating --.

In column 4, line 54, in Claim 6, after "wherein" insert -- said heating --.

Signed and Sealed this

Sixth Day of February, 2007

JON W. DUDAS  
*Director of the United States Patent and Trademark Office*